(12) United States Patent
Geipel et al.

(10) Patent No.: US 12,460,816 B2
(45) Date of Patent: Nov. 4, 2025

(54) OPTICAL FEEDBACK CONTROL MECHANISM FOR SOLID REACTANT STRAND POSITIONING

(71) Applicant: The Government of the United States of America, as represented by the Secretary of the Navy, Arlington, VA (US)

(72) Inventors: Clayton Geipel, Washington, DC (US); Brian Fisher, Crofton, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 405 days.

(21) Appl. No.: 18/144,992

(22) Filed: May 9, 2023

(65) Prior Publication Data

US 2023/0366542 A1    Nov. 16, 2023

Related U.S. Application Data

(60) Provisional application No. 63/340,889, filed on May 11, 2022.

(51) Int. Cl.
| | | |
|---|---|---|
| *F23N 1/00* | (2006.01) | |
| *F23K 3/00* | (2006.01) | |
| *G01N 33/22* | (2006.01) | |
| *G05D 3/12* | (2006.01) | |

(52) U.S. Cl.
CPC ............... *F23N 1/002* (2013.01); *F23K 3/00* (2013.01); *G01N 33/222* (2013.01); *G05D 3/125* (2013.01); *F23K 2203/202* (2013.01); *F23N 2239/02* (2020.01)

(58) Field of Classification Search
CPC ... F23N 1/002; F23N 2239/02; G01N 33/222; G05D 3/125; F23K 3/00; F23K 2203/202
See application file for complete search history.

(56) References Cited

U.S. PATENT DOCUMENTS

| | | | | |
|---|---|---|---|---|
| 4,959,549 A | * | 9/1990 | Haub | G01N 33/222 250/359.1 |
| 2018/0120096 A1 | * | 5/2018 | Kruesi | G01L 1/241 |

FOREIGN PATENT DOCUMENTS

| | | | |
|---|---|---|---|
| CN | 113621793 | * | 11/2021 |
| PL | 246174 | * | 12/2024 |

* cited by examiner

*Primary Examiner* — Alfred Basichas
(74) *Attorney, Agent, or Firm* — US Naval Research Laboratory; Rebecca L. Forman

(57) ABSTRACT

The present invention provides a method and apparatus for controlled burning of experimental solid fuel test strands. The fuel test strand is advanced by a screw attached to a computer-controlled stepper motor. The stepper motor controls the fuel test strand position via a proportional-integral-derivative (PID) control loop, adjusting velocity based on transmission of a diode laser beam located at the desired fuel surface position. This provides real-time monitoring of fuel strand position and fuel regression rate during combustion experiments.

8 Claims, 15 Drawing Sheets

OPTICAL FEEDBACK CONTROL MECHANISM FOR SOLID REACTANT STRAND POSITIONING

PRIORITY CLAIM

The present application is a non-provisional application claiming the benefit of U.S. Provisional Application No. 63/340,889, filed on May 11, 2022 by Clayton Geipel et al., entitled "OPTICAL FEEDBACK CONTROL MECHANISM FOR SOLID REACTANT STRAND POSITIONING." This application and all other publications and patent documents referred to throughout this nonprovisional application are incorporated herein by reference in their entirety.

BACKGROUND OF THE INVENTION

Field of the Invention

The invention relates to the field of control mechanisms for the position of a burning solid reactant strand.

Description of the Prior Art

The combustion of solid fuels with liquid or gaseous oxidizers has multiple practical applications including hybrid rocket motors and solid-fuel ramjets. An opposed-flow burner (OFB) can be used as a simple canonical environment to test and screen new fuels and to investigate fundamental combustion behaviors. (Young et al., "Combustion of alane-based solid fuels," Int. J. Energ. Mater. Chem. Propuls., vol. 9, no. 3, pp. 249-266, 2010; Zaseck et al., "Paraffin fuel and additive combustion in an opposed flow burner configuration," in 48th AIAA/ASME/SAE/ASEE Joint Propulsion Conference and Exhibit, 2012; Shark et al., "Solid-fuel regression rates and flame characteristics in an opposed flow burner," J. Propuls. Power, vol. 30, no. 6, pp. 1675-1682, 2014; and Nardozzo et al., "Diffusion flame studies of solid fuels with nitrous oxide," Int. J. Energ. Mater. Chem. Propuls., 19, 73, 2020). An OFB consists of a solid fuel strand holder and an oxidizer flow tube directed normal to one another. The solid strand pyrolyzes and gaseous fuel meets the oxidizer stream at a stagnation plane. Typically, the fuel strand is spring-loaded against a retaining wire. (Heller et al., "Structure of the gas phase combustion region of a solid double base propellant," J. Phys. Chem, vol. 59, no. 8, pp. 773-777, 1955). OFBs are used to approximate the combustion of a fuel in an oxidizer crossflow as would be found in a hybrid rocket motor or solid-fuel ramjet. They have also been used to examine the combustion of a solid oxidizer with a gaseous fuel stream. (Young et al., "Combustion behavior of solid oxidizer/gaseous fuel diffusion flames," J. Propuls. Power, vol. 29, no. 2, pp. 362-370, 2013). Similar burners that have two opposing gaseous flows of fuel and oxidizer are called counterflow burners and are commonly used to produce idealized one-dimensional flames for fundamental measurements of combustion chemistry.

In strand burner experiments, a solid strand and a gaseous flow react and burn. Depending on the experimental configuration, the strand and the flow may be fuels, oxidizers, or combinations of both. If the position of the strand is not controlled by a device, then the reacting surface regresses as strand material is consumed. This is often undesirable for two reasons. First, the flame cannot be kept at a steady state as the position of the reacting surface changes relative to the flow. Second, the moving flame may leave the space accessible to measurement devices; e.g., the flame may leave the field of view of a camera set up to monitor it.

The most common device used to control the fuel position comprises a spring, a vertical strand guide, and a retaining wire. (Heller et al., "Structure of the gas phase combustion region of a solid double base propellant," J. Phys. Chem, vol. 59, no. 8, pp. 773-777, 1955; Young et al., "Combustion of alane-based solid fuels," Int. J. Energ. Mater. Chem. Propuls., vol. 9, no. 3, pp. 249-266, 2010; Young et al., "Combustion behavior of solid oxidizer/gaseous fuel diffusion flames," J. Propuls. Power, vol. 29, no. 2, pp. 362-370, 2013; Zaseck et al., "Paraffin fuel and additive combustion in an opposed flow burner configuration," in 48th AIAA/ASME/SAE/ASEE Joint Propulsion Conference and Exhibit, 2012; and Shark et al., "Solid-fuel regression rates and flame characteristics in an opposed flow burner," J. Propuls. Power, vol. 30, no. 6, pp. 1675-1682, 2014). The fuel strand is spring-loaded against a retaining wire (usually made of a high-temperature alloy such as nichrome) so that the pyrolyzing surface remains stationary as the fuel regresses.

The method of controlling fuel position with a retaining wire poses challenges to collecting and interpreting experimental data. Depending on the position of the wire and the temperature at the fuel surface, the wire may be prone to failure. Depending on the severity of the failure, it may cause a shift in fuel position, or a complete loss of the test. Additionally, the presence of the wire may have multiple effects on combustion dynamics that bias experimental measurements. It may interact with the oxidizer flow, creating recirculation regions and altering the boundary layer over the fuel surface. It may also influence heat transfer between the flame and the fuel strand.

Methods of actively controlling fuel position have been used for other combustion experiments. (Rekers et al., "Flame zone spectroscopy of solid propellants," Rev. Sci. Instrum., vol. 25, no. 5, pp. 424-429, 1954; Picard et al., "Apparatus for determining combustion rate of solid propellants," Ind. Eng. Chem., vol. 56, no. 1, pp. 49-52, 1964; Edwards et al., "High-pressure combustor for the spectroscopic study of solid propellant combustion chemistry," Rev. Sci. Instrum., vol. 56, no. 11, pp. 2131-2137, 1985; and Field, Observations of surface structure and regression behavior of solid propellant strands burning under narrow gap conditions. Thesis, 1993). These typically involve a beam of focused or collimated light that is partially obstructed by the fuel surface. The unobstructed portion of the beam is collected by a sensor. The light level that the sensor observes is input into a control loop, which then drives a motor system that modifies the position of the fuel strand. This obviates the need for the wire, but can introduce different challenges. The light level observed by the sensor could be biased by absorption of light by combustion products, natural flame luminosity, or beam steering effects due to density gradients in the flame.

SUMMARY OF THE INVENTION

The purpose of the present invention is to digitally measure and control the position of a burning solid fuel or oxidizer surface in laboratory experiments. Digital measurements of fuel position are used to calculate fuel regression rate, a critically important performance and screening metric for solid fuels, as a function of time.

This invention provides an active method of controlling the position of the burning surface of a solid fuel strand in an opposed-flow burner experiment. This method is designed to avoid biases to the combustion process introduced by retaining wires and to avoid experimental delays caused by wire failures. The active control method uses a control loop comprising a diode laser, a photodiode, and a stepper motor.

The control system is entirely digital, which provides several advantages. Due to its digital formulation, the position control system is able to be integrated into a larger burner control software application. The control system is activated at a predetermined time in a countdown sequence and deactivated when the position of the motor indicates that the fuel is about to run out. The digital control system saves the motor position data as a function of time, permitting direct calculation of regression rate as a function of time. The regression rate can be determined without needing an additional device, such as a linear potentiometer, to acquire this data. Moreover, the regression rate as a function of time can be obtained instead of just a time-averaged regression rate.

These and other features and advantages of the invention, as well as the invention itself, will become better understood by reference to the following detailed description, appended claims, and accompanying drawings.

BRIEF DESCRIPTION OF THE DRAWINGS

FIG. 4A shows a passive control system. FIG. 4B shows an active control system.

FIG. 5A shows 24 American Wire Gauge (AWG) with a diameter of 0.51 mm. FIG. 5B shows 22 AWG with a diameter of 0.64 mm. FIG. 5C shows 20 AWG with a diameter of 0.81 mm.

FIG. 7A shows an image of a passive control test. FIG. 7B shows an image of an active control test.

FIG. 8A shows a side view, and FIG. 8B shows an inclined view.

FIG. 14A is for $X_{O2}=0.5$, and FIG. 14B is for $X_{O2}=1$.

DETAILED DESCRIPTION OF THE INVENTION

Figure 1:
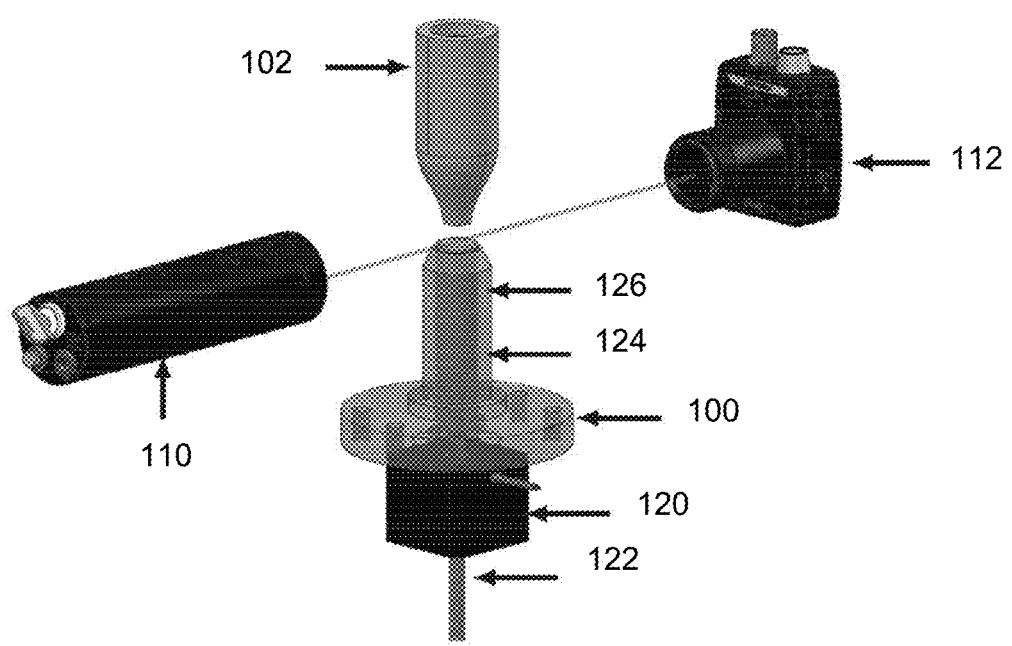
FIG. 1 is a device schematic for the optical feedback control mechanism for solid reactant strand positioning.

One embodiment of the active control method of the present invention is diagrammed in FIG. 1. An aluminum tube with a beveled rim and inner diameter 16.5 mm is used as a fuel strand holder 100. A stainless steel oxidizer nozzle 102 opposes the fuel holder 100. A diode laser 110 (Thorlabs, LDM 635, $\lambda_0$ 635 nm, $P_0$ 4 mW) produces a beam with an elliptical cross section (approximately 3 mm×5 mm) which passes above the top of the fuel holder 100 with the long axis of the cross section oriented perpendicular to the burner axis. The beam from the diode laser 110 is collected by a photodiode 112 (Thorlabs, DET100A2) through a bandpass filter (Thorlabs, FLH633-5, Ø25 mm, $\lambda_0$=633 nm, $\Delta\lambda$=5 nm) and neutral density filters. The bandpass filter prevents most of the broadband flame luminescence from biasing the photodiode signal output while the neutral density filters keeps the photodiode output voltage beneath its maximum limit. A borosilicate glass window protects the filters from the flame and should be periodically replaced as it becomes clouded with soot. The photodiode voltage output V was compared to a predetermined target voltage $V_0$. When the top surface of the fuel strand protruded about 2 mm from the fuel holder 100 and obscured part of the laser beam, the resulting photodiode voltage output was set as the target voltage. During fuel strand combustion, the photodiode voltage error $e=V-V_0$ was input to a proportional-integral control loop in a LabVIEW script (LabVIEW function PID). The output of the control loop determined the speed at which a stepper motor 120 (Haydon, 43F4) advanced a lead screw 122. The lead screw 122 pushed a piston 124 supporting a fuel strand 126 upward. The period of the control loop was 0.25 s. The proportional and integral gains were set by trial-and-error until the control loop: 1) was stable, 2) responded quickly to changes in fuel regression rate, and 3) was not significantly affected by momentary obstructions of the beam by debris. No derivative gain was necessary, so the derivative gain was set to zero. The control loop was prohibited from retracting the fuel surface downward during combustion. The sequence of digital commands sent to the stepper motor throughout combustion was recorded and used to determine the position of the fuel as a function of time and the fuel regression rate as a function of time.

The invention was tested and directly compared to a conventional wire-based fuel control apparatus. Combustion tests using the invention were not prone to failure due to wire breakage; this occurred occasionally in tests of the wire-based fuel control system. The presence of the wire in the conventional system perturbs combustion processes, introducing undesirable bias in experimental results. The present invention avoids this bias completely. An ancillary benefit of this control method is a reduction in time needed to set up an experiment. Wire-based tests required about ten minutes to set up. Active control tests required about five minutes, due to the removal of the time-consuming step of securing the retaining wire to the fuel holder with aluminum tape.

Experimental Design

This method of active control for the position of a solid fuel strand was tested inside an opposed-flow burner (OFB), and is the first application of such a system to OFB research. Burn tests were conducted with hydroxyl-terminated polybutadiene (HTPB) fuel for a variety of oxidizer streams and with both active and passive control methods. The two methods are similarly effective at maintaining a stationary fuel surface during combustion. The active control method avoids issues with passive control: test failure due to wire breakage and influence of the wire on the combustion process. However, the active control method can only be used at high oxidizer flow rates; sooty debris produced at low flow rates interferes with optical feedback. The bias in regression rate due to the wire is relatively small; however, the wire has a significant effect on fuel extinction behavior.

A model is presented that accounts for the effects of oxidizer mass flux, oxygen mole fraction in the oxygen/nitrogen oxidizer stream, and retaining wire diameter on regression rate. As retaining wire diameter increases, regression rate increases, suggesting that the wire acts as a heat source feeding the pyrolysis process.

Opposed-Flow Burner

To prepare the fuel strands, HTPB resin (R-45M) was mixed with a curative (isophorone diisocyanate, 10 wt %) and a cure catalyst (triphenylbismouth, 0.2 wt %) for ten minutes at room temperature and pressure. Gas was evacuated from the mixing chamber for ten more minutes of mixing in order to degas the resin. The fully mixed resin was poured into 16-mm-diameter cylindrical molds, and cured at 65-70° C. for 72 hours at which time the resin was fully cured. Fuel strands were kept in a desiccator at room temperature and pressure and 15% relative humidity, and removed only for testing.

Figure 2:
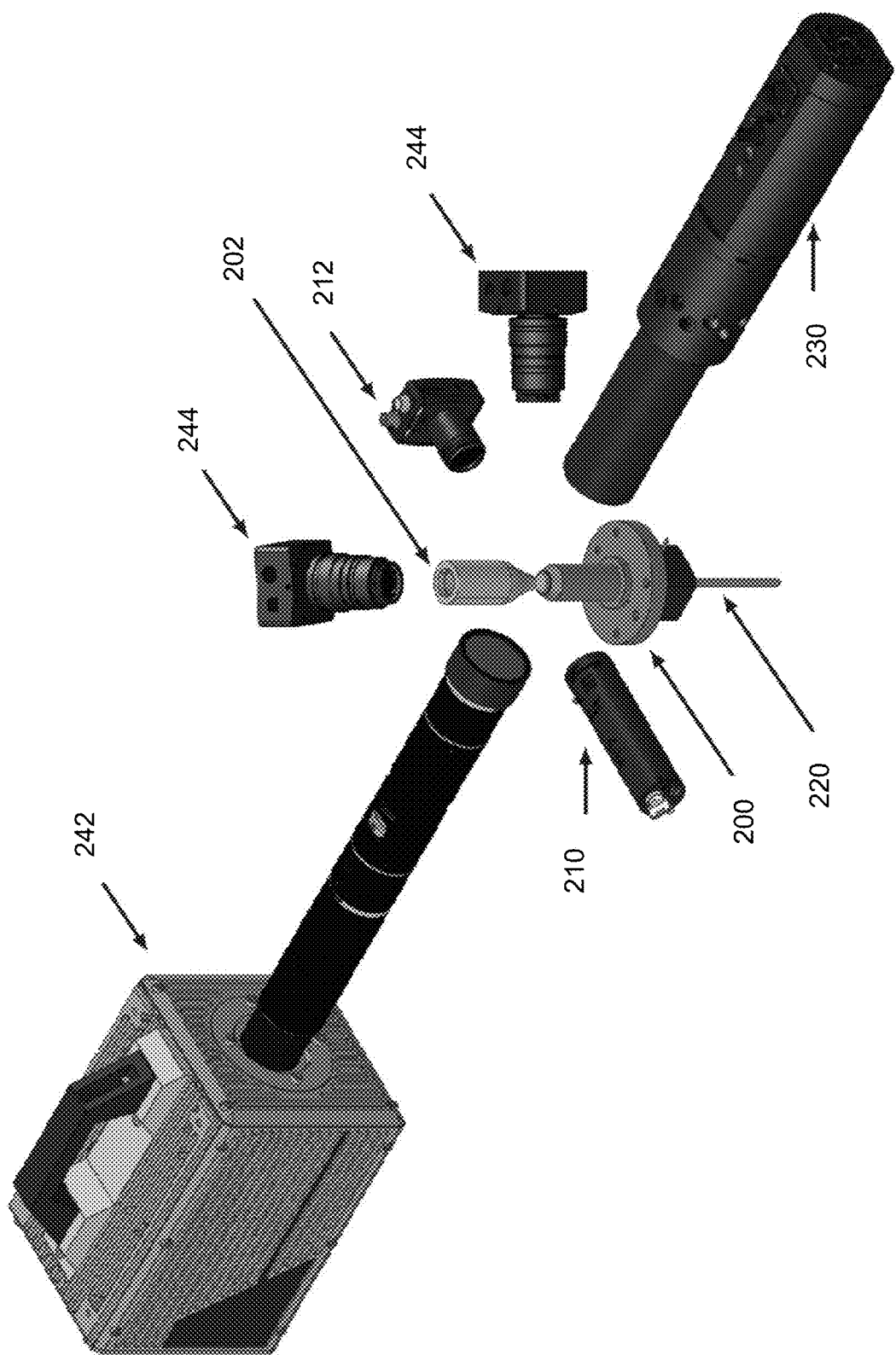
FIG. 2 is an experimental setup overview.

An overview of the apparatus used in this experiment is shown in FIG. 2. An aluminum tube with a beveled rim and inner diameter 16.5 mm was used as a fuel strand holder 200. A stainless steel oxidizer nozzle 202 opposes the fuel holder 200. The separation distance between the oxidizer nozzle and fuel surface could easily be changed to investigate strain rate effects on the flame. The separation distance was set to 10 mm for the tests presented here. Two mass flow controllers (Alicat, 0-250 SLPM) provided gaseous oxygen and nitrogen to the oxidizer nozzle. A laser 210 produces a beam that passes over the top of the fuel holder 200 and is collected by a photodiode 212. A stepper motor 220 is used to push the fuel strand upward. A collimated light source 230 illuminates the burner. Images are captured with a high speed CMOS camera 242 and additional CMOS cameras 244.

Oxidizer gas was fed to the nozzle 202 through a steel pipe of length 12 cm and inner diameter 1.91 cm. Over a 30-mm streamwise distance, the inner diameter of the nozzle tapered from 19 mm at the inlet to 7.25 mm at the exit. Similar nozzle designs have been used in previous OFB studies (Young et al., "Combustion of alane-based solid fuels," Int. J. Energ. Mater. Chem. Propuls., vol. 9, no. 3, pp. 249-266, 2010 and Shark et al., "Solid-fuel regression rates and flame characteristics in an opposed flow burner," J. Propuls. Power, vol. 30, no. 6, pp. 1675-1682, 2014). The contoured shape of the nozzle 202 was chosen to produce a top-hat exit velocity profile (Bergthorson et al., "Impinging laminar jets at moderate reynolds numbers and separation distances," Phys. Rev. E Stat. Nonlin. Soft Matter Phys., 72, 066307, 2005), though the exit velocity profile from this nozzle has not been measured.

Figure 3:
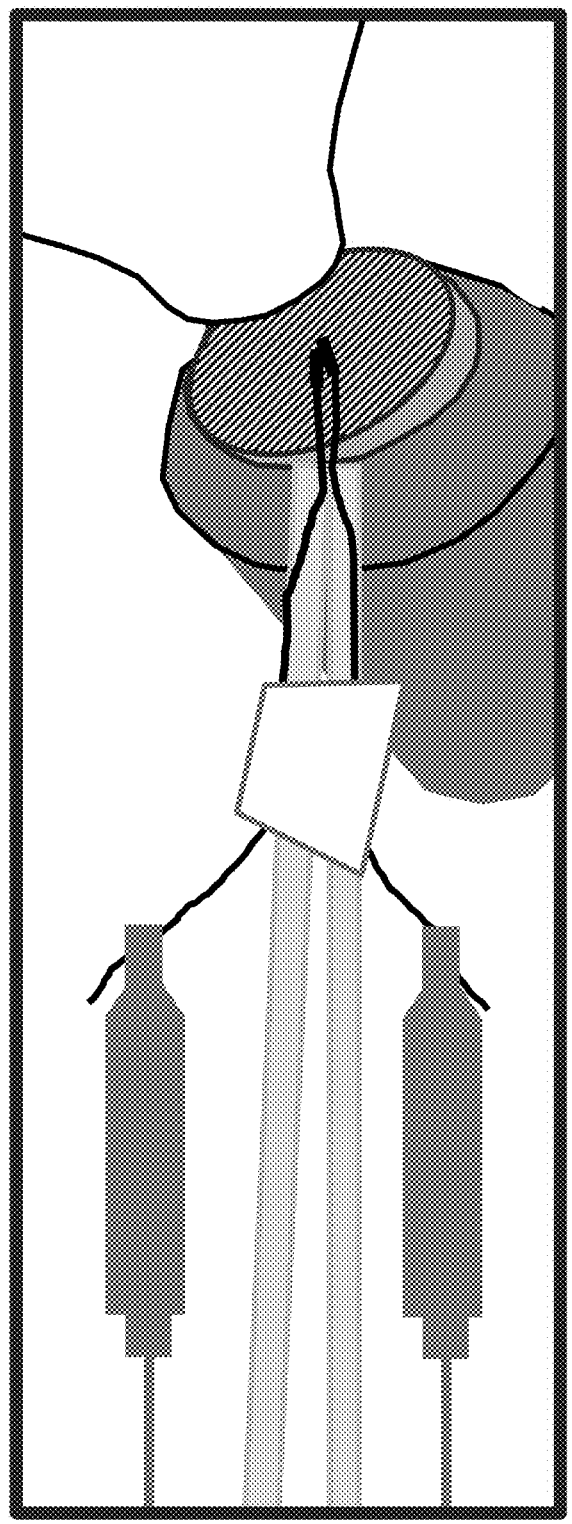
FIG. 3 is an image of a model rocket starter in place for HTPB strand ignition.

Model rocket starters (Estes, StarTech) were used as disposable ignition sources. The head of the starter rested on top of the fuel surface at the center, as shown in FIG. 3. A relay was used to route electrical current through the starter to initiate the burn test at the desired time. Shortly afterward, a linear solenoid actuator pulled the remains of the starter away from the burner.

Fuel Strand Position Control Methods

Figure 4A:
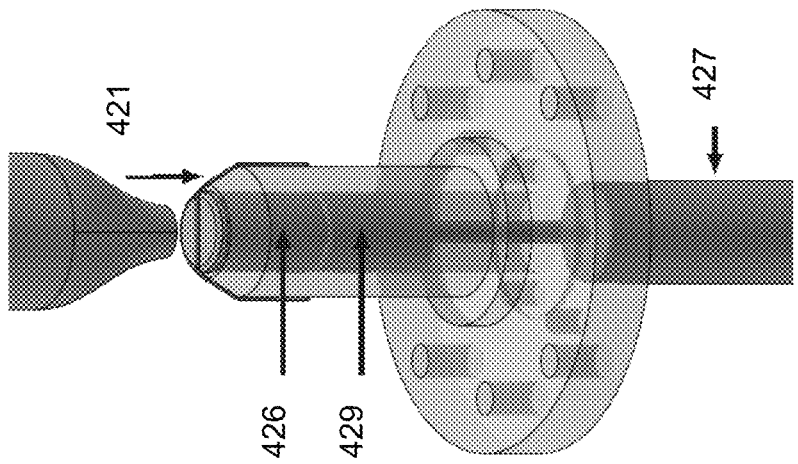
Figures 5A, 5B, 5C:
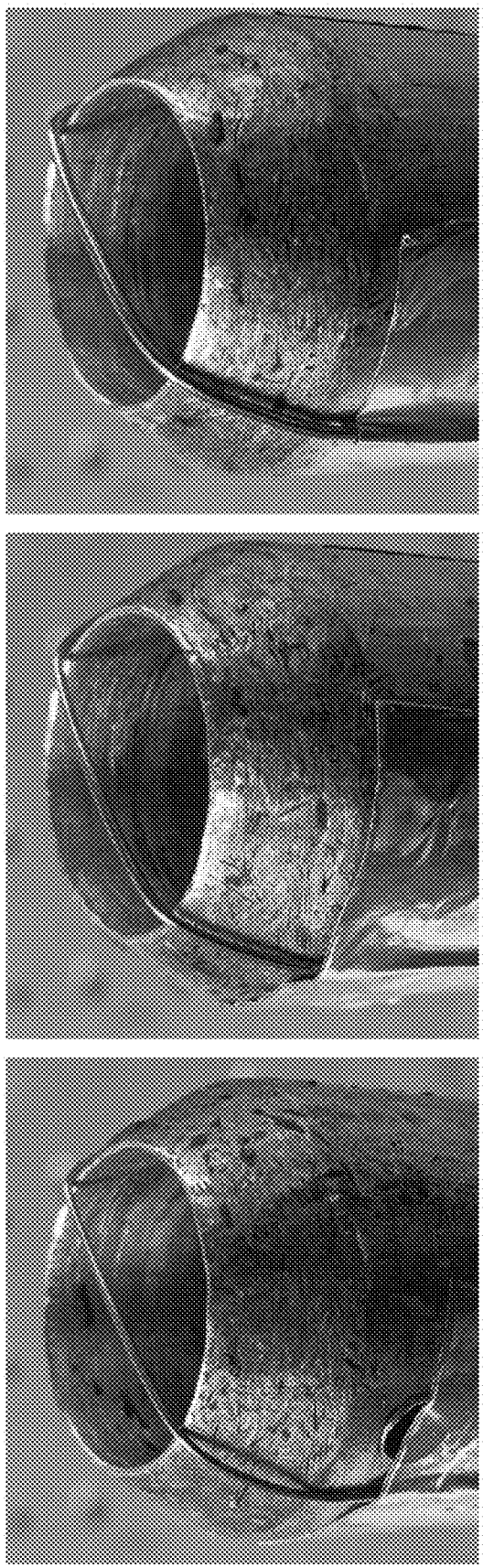
FIGS. 5A-C show three gauges of retaining wires.

Two different methods were implemented to maintain a stationary fuel surface throughout the burn. The commonly used passive control method is shown in FIG. 4A. A linear variable differential transformer (LVDT) 427 (RDP Electrosense, DCV050A) applied a spring force to a steel piston 429, pressing the fuel strand 426 against a nichrome retaining wire 421. The piston was approximately 15 mm in diameter and 25 mm in length. FIGS. 5A-C show the three gauges of retaining wires used in this experiment, attached to the fuel holder with aluminum tape. FIG. 5A shows 24 American Wire Gauge (AWG) with a diameter of 0.51 mm. FIG. 5B shows 22 AWG with a diameter of 0.64 mm. FIG. 5C shows 20 AWG with a diameter of 0.81 mm. As material burned away from the fuel strand, the strand was pressed upward so that the top surface remained roughly stationary. During this process, the wire was partially submerged in a multiphase transition layer in which HTPB melted and boiled. The LVDT output voltage was used to record the fuel surface position as a function of time during the combustion process.

Figure 4B:
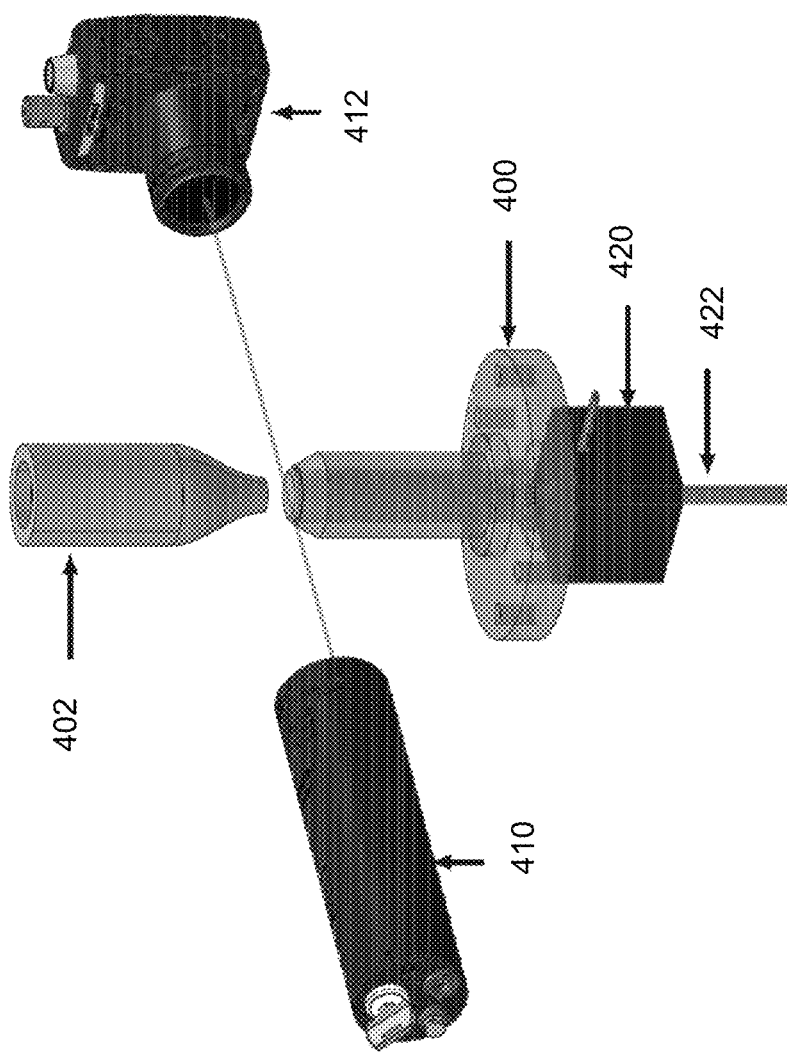
FIGS. 4A-B show fuel position control systems.

An embodiment of the active control method of the present invention is diagrammed in FIG. 4B. A fuel holder 400 is opposed to an oxidizer nozzle 402. A diode laser 410 produced a beam with an elliptical cross section which passed above the top of the fuel holder 400 with the long axis of the cross section oriented perpendicular to the burner axis. The beam was collected by a photodiode 412. A stepper motor 420 advances a lead screw 422 to push a fuel strand upwards.

Imaging

Figure 6:
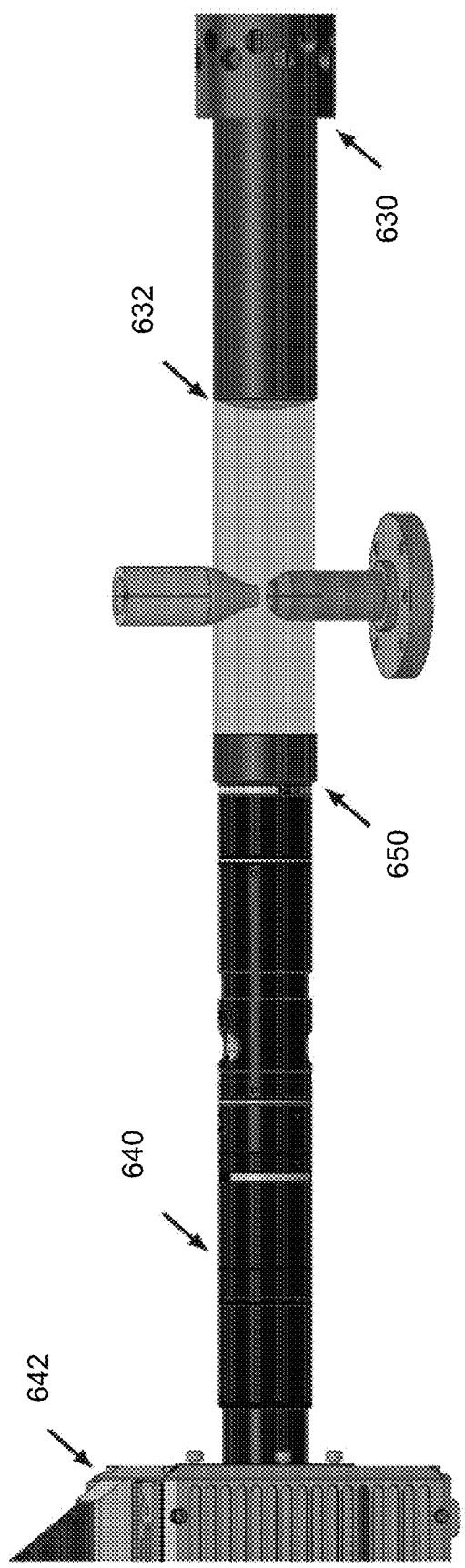
FIG. 6 is a schematic of a shadowgraph imaging setup.

FIG. 6 is a schematic of the implemented shadowgraph imaging setup. A ground-glass diffuser was placed immediately in front of a pulsed LED source 630 (ISSI, LZ-620, $\lambda_0$=633 nm), and a fused silica plano-convex lens 632 (f=150 mm, Ø50 mm) was mounted in a lens tube, separated from the diffuser by f. This produced a roughly collimated lightfield illuminating the burner. Images were captured through a zoom lens 640 (Navitar, Resolv4k) using a high-speed CMOS camera 642 (Photron, Fastcam SA5). A bandpass filter 650 (Andover, 633FSX10-50, Ø50 mm, $\lambda_0$=633 nm, $\Delta\lambda$=10 nm) was used to admit light from the LED source and reject broadband flame luminescence.

Grayscale 12-bit images were collected at 60 Hz and exposure duration 16.4 µs. The camera sent trigger pulses to the LED source to synchronize the camera shutter and the light pulse. Prior to burn tests, baseline lightfield images were recorded. The mean baseline image was used to correct for nonuniformities in the lightfield. Images of reference objects were acquired to establish image scale: 102 pixels per mm, resulting in a field of view of 10 mm×10 mm across 1024 pixels×1024 pixels.

Two additional CMOS cameras (Mightex, SME-C050-U) (see FIG. 2, 244) fitted with zoom lenses (Navitar, MVL12M23, f=12 mm, f/1.4) and neutral-density filters were used to record flame luminosity during burn tests. One had an image axis perpendicular to the oxidizer nozzle axis, capturing a side view of the flame. The other obtained an inclined view, angled downward approximately 45° to the fuel surface. Borosilicate glass windows shielded the lenses of all three cameras from debris ejected from the burner.

Ignition Sequence

A LabVIEW application was used to control the devices in this experiment. It performed the following actions in sequence for each burn test:

Begin desired oxidizer flow through nozzle;
Trigger all cameras to begin recording;
Engage active fuel position control (if applicable);
Ignite and retract starter; and
When remaining fuel length is 4 mm, replace oxidizer flow with nitrogen to extinguish.

At preset intervals during a single burn, the mass flux and oxygen mole fraction of the oxidizer flow could be varied. By this method, data points at several different flow conditions were recorded for a single burn test.

Results

Image Processing

Figure 7B:
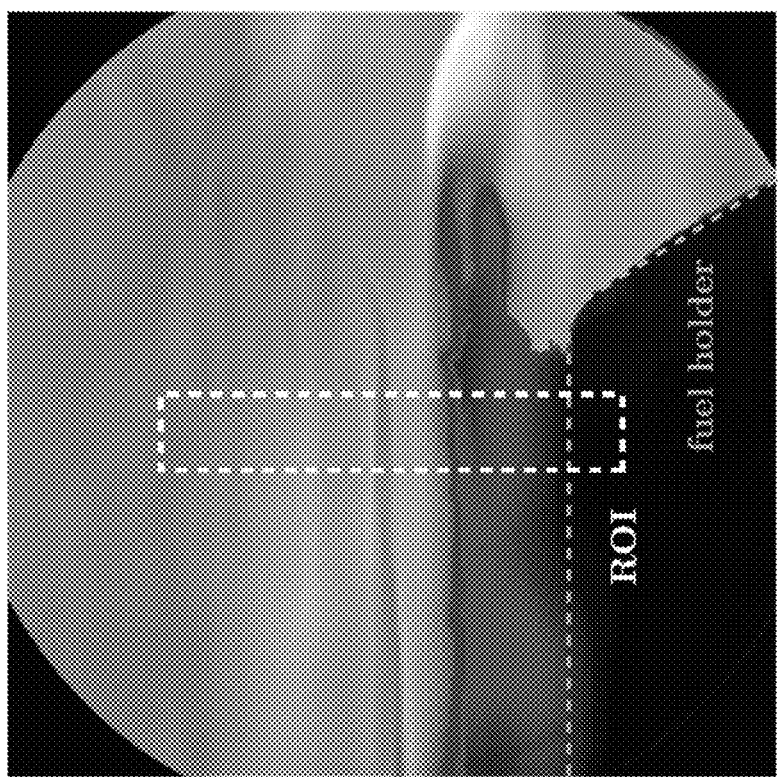
FIGS. 7A-B show shadowgraph images of burn tests.
Figure 7A:
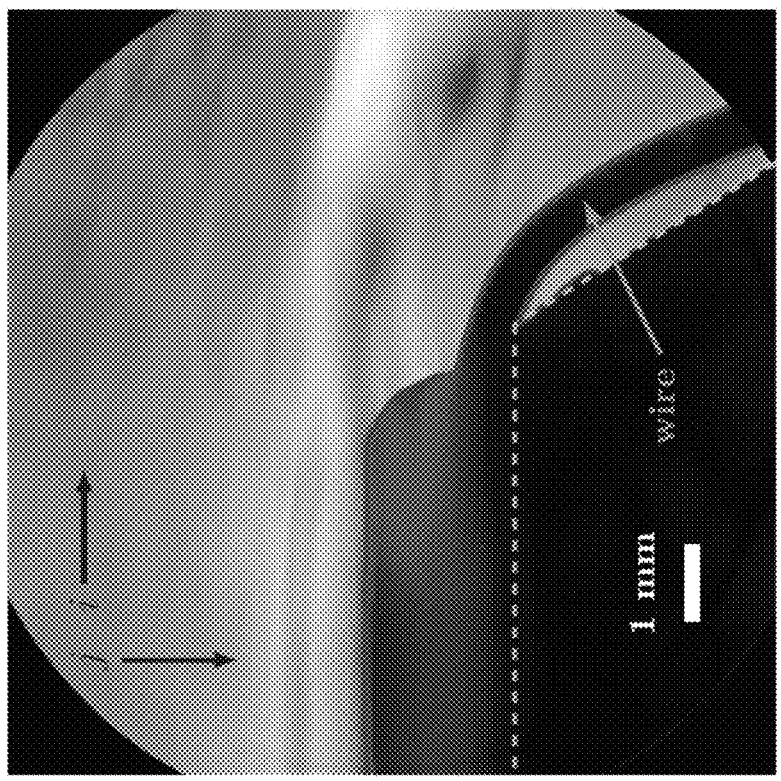
Figure 8B:
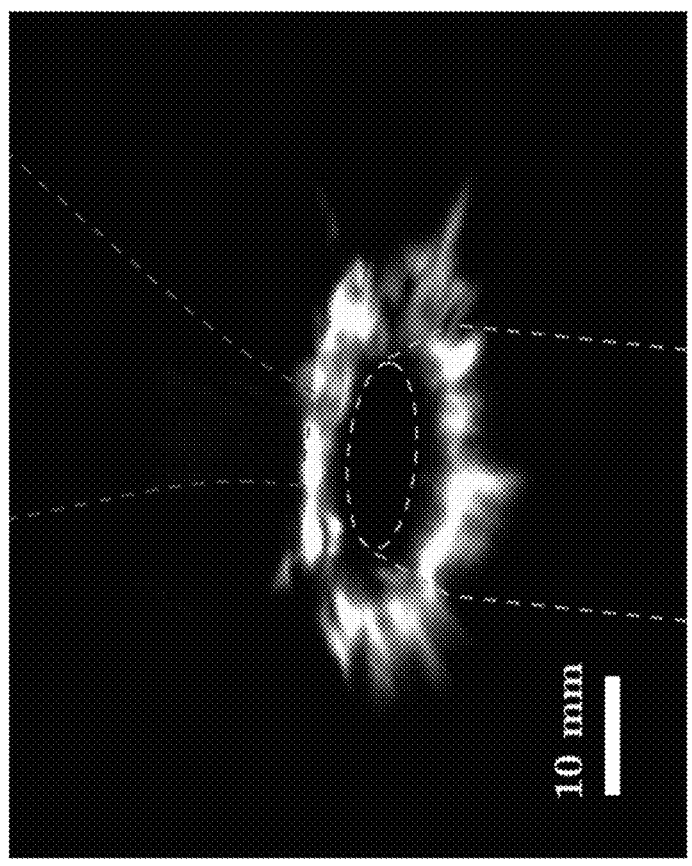
FIGS. 8A-B show Mightex CMOS images.
Figure 8A:
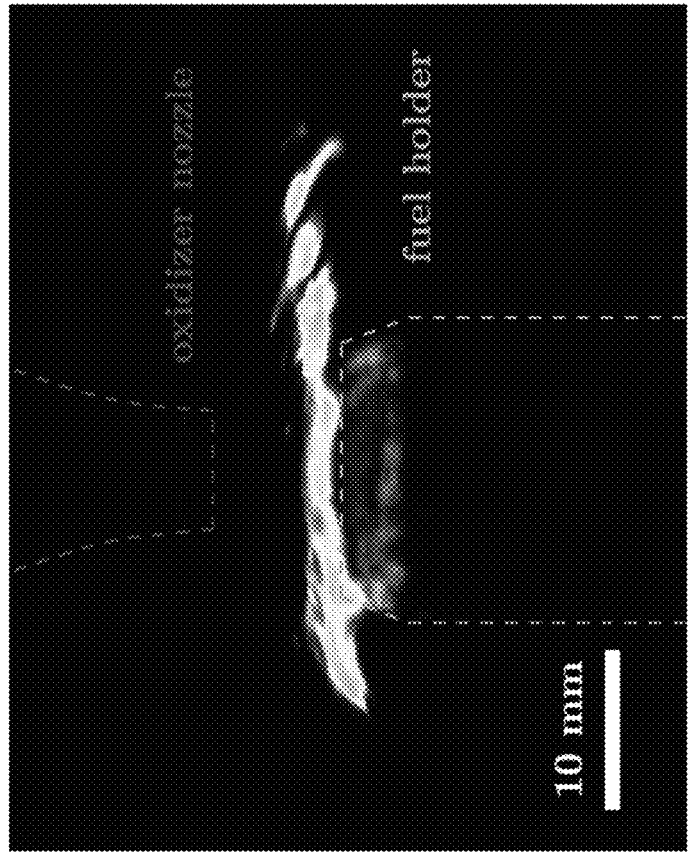

FIGS. 7A and 7B shows two representative shadowgraph images of burn tests. A passive control test with wire diameter d=0.64 mm is shown in FIG. 7A, and an active control test is shown in FIG. 7B. The tests were performed with oxygen mole fraction $X_{O2}=1$. In both images, a density gradient is present about 1 mm above the fuel surface; this is the edge of the reaction zone between the pyrolyzed fuel and the oxidizer stream. The fuel surfaces are surrounded by bright and dark regions of soot. Wider views of luminous soot emissions were acquired by Mightex CMOS cameras; side and inclined views of a passive-control test are shown in FIGS. 8A and 8B.

An image processing script was developed to evaluate shadowgraph images and determine the fuel protrusion height: the distance that the fuel strand protruded above the top of the fuel holder. The variation of the fuel protrusion height over time during burn tests provided estimates of stability for the fuel surface position for both active and passive control methods. Each shadowgraph image is first corrected by subtracting a mean image of the unobstructed lightfield. The resulting corrected shadowgraph image $I(i, j)$ is a matrix of pixel intensities, where i and j are pixel indices in the directions shown in FIG. 7A, with values from 1 to 1024. A region of interest (ROI) $\{i_1, \ldots, i_n; j_1, \ldots, j_n\}$ was defined as shown in FIG. 7B. A vertical profile of pixel intensities P $(j \in \{j_1, \ldots, j_n\})$ was calculated as $$P(j) \equiv \frac{1}{i_n - i_1} \sum_{i=i_1}^{i_n} I(i, j).$$

The pixel intensity gradient along this profile was calculated as $$\frac{\partial P}{\partial j}(j) \equiv P(j) - P(j-1).$$

The location of the fuel surface was marked by a prominent local minimum in the value of $\partial P/\partial j$. A local minimum of similar prominence was sometimes also present at the location of the flame boundary. To distinguish between these, the script identified the most prominent local minimum and then identified all local minima that are at least half as prominent. Of these local minima, the one closest to the fuel holder rim (i.e. the one at the highest value of j) is defined as the fuel surface position. The distance from this position to the fuel holder rim is defined as the fuel protrusion height. The fuel surface position identified by the algorithm was sometimes erroneous in frames with extremely strong density gradients at the flame boundary or obstructions in the lightfield due to soot. To reduce the impact of these errors and to reduce noise, profiles of h shown in the following section were processed with a moving-average filter with a window of 0.25 s.

Example Burn Tests

Figure 9:
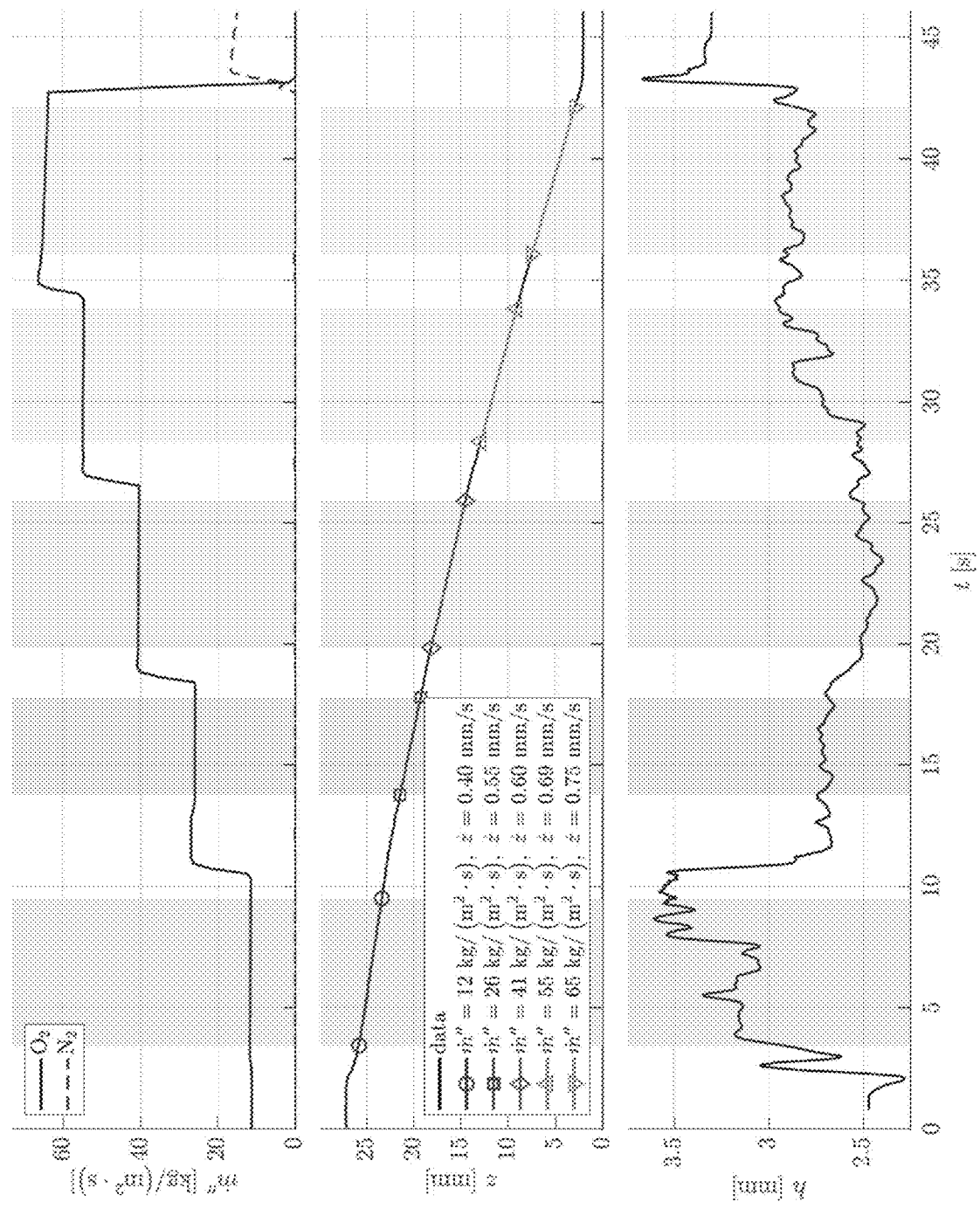
FIG. 9 shows passive control burn test data.
Figure 10:
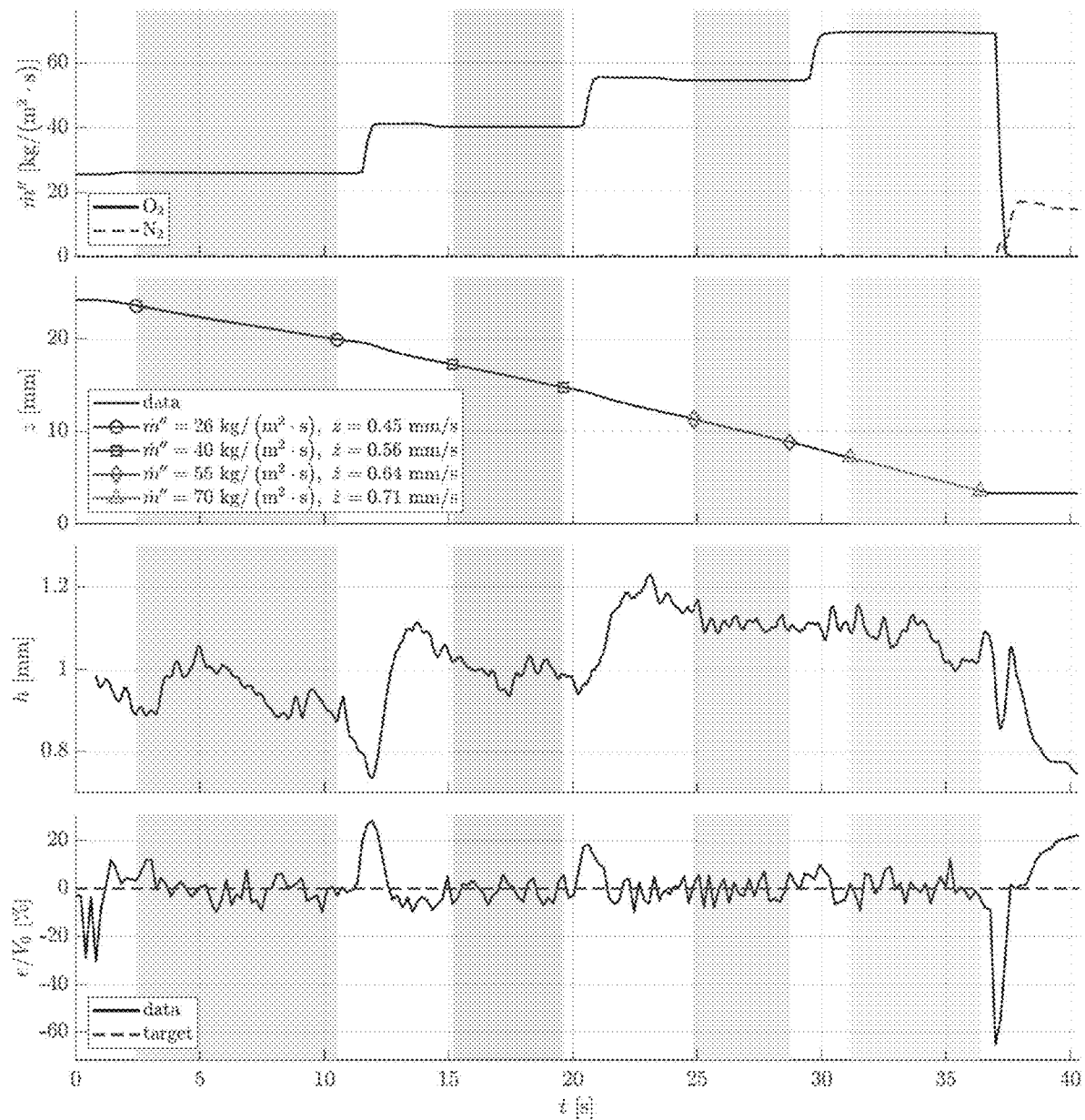
FIG. 10 shows active control burn test data.

FIG. 9 is an example of the data collected during a single passive control burn test. Four quantities are presented as functions of time t: mass flux $\dot{m}^H$ for oxygen and nitrogen in the oxidizer flow, strand length z, fuel protrusion height h. FIG. 10 displays the same data for an active control test as well as the normalized photodiode voltage error $e/V_0$.

Strand ignition occurred at t=0. Mass flux (in units of mass per time per area) is defined as the mass flow rate through the oxidizer nozzle normalized by the nozzle exit area. Multiple different oxidizer mass flux values were tested before the flame was extinguished. In the active control test, the photodiode voltage oscillated around the target value within about ±10%, with larger errors occurring during ignition, flow transitions, and shutdown. Linear fits of z(t) were applied to periods of constant mass flux in order to calculate regression rates ż for those periods.

Shadowgraph images from several multi-flowrate tests were analyzed to determine the overall variability of the fuel surface position. In five active control tests and five passive control tests selected for shadowgraph image analysis, h was kept constant within ±0.7 mm. The average variability for both methods was similar: ±0.37 mm for passive control tests and ±0.43 mm for active control tests. For active control tests, the movement of the fuel surface may be due to occlusion or attenuation of the laser beam by debris, or by beam steering effects caused by density gradients. In passive control tests, the variability could be caused by changes in the depth of the layer of melted HTPB in which the retaining wire is submerged. Alternatively, the fuel surface movement could be caused by high temperatures degrading the retaining wire or the aluminum tape that secured the wire.

Combustion Behavior Comparison

Figure 11:
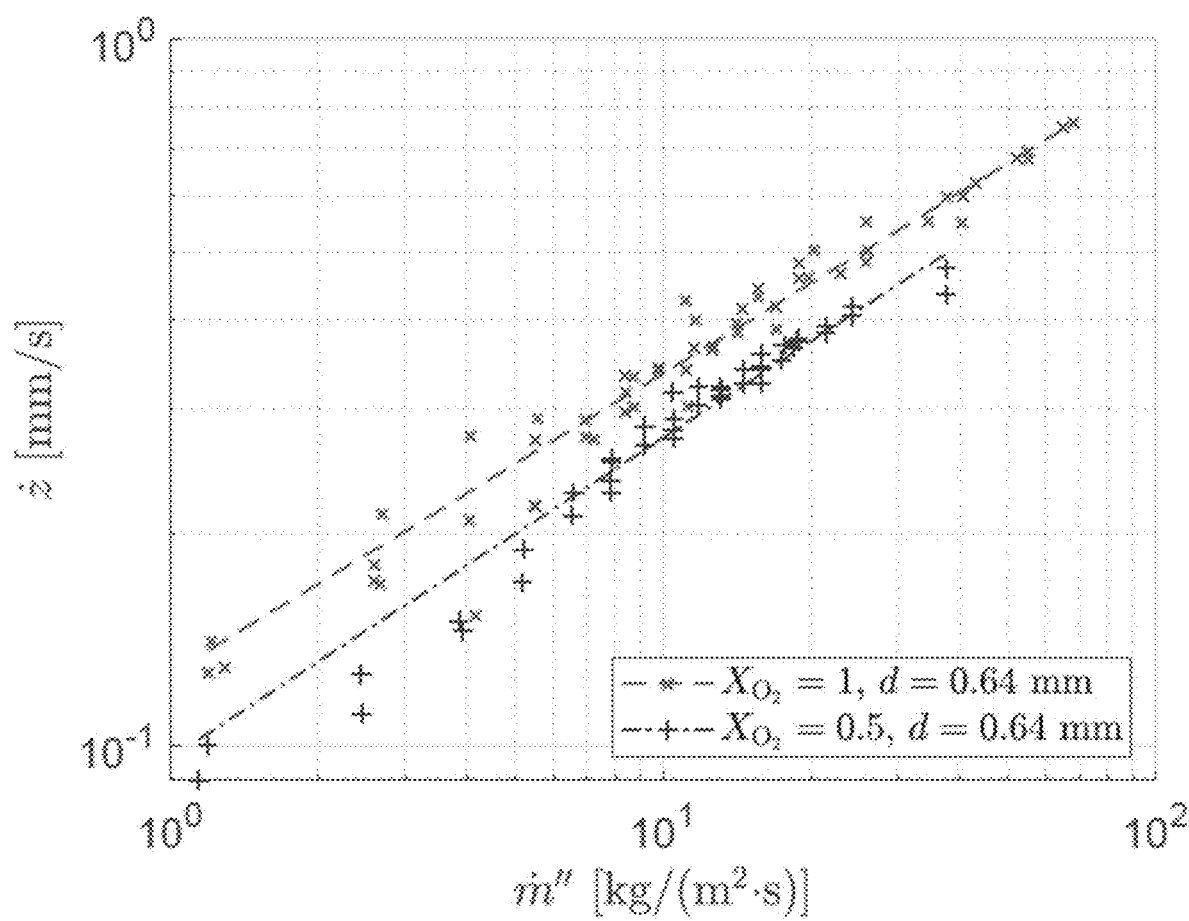
FIG. 11 shows passive control burn test results for a d=0.64 mm wire.

Both regression rate and extinction behavior depend on the fuel strand position control method used. FIG. 11 shows results from passive control tests with d=0.64 mm. These results were compared to a quasi-one dimensional opposed-flow HTPB combustion simulation. The relationship between regression rate and mass flux follows a power law fitted curve for both $X_{O2}=0.5$ and 1. All tests were limited to $\dot{m}$"<70 kg/(m$^2$·s); the oxidizer supply system could not exceed this value. Passive control tests with $X_{O2}=0.5$ were further limited to $\dot{m}$"<40 kg/(m$^2$·s); increasing mass flux beyond this point causes extinction.

Figure 12:
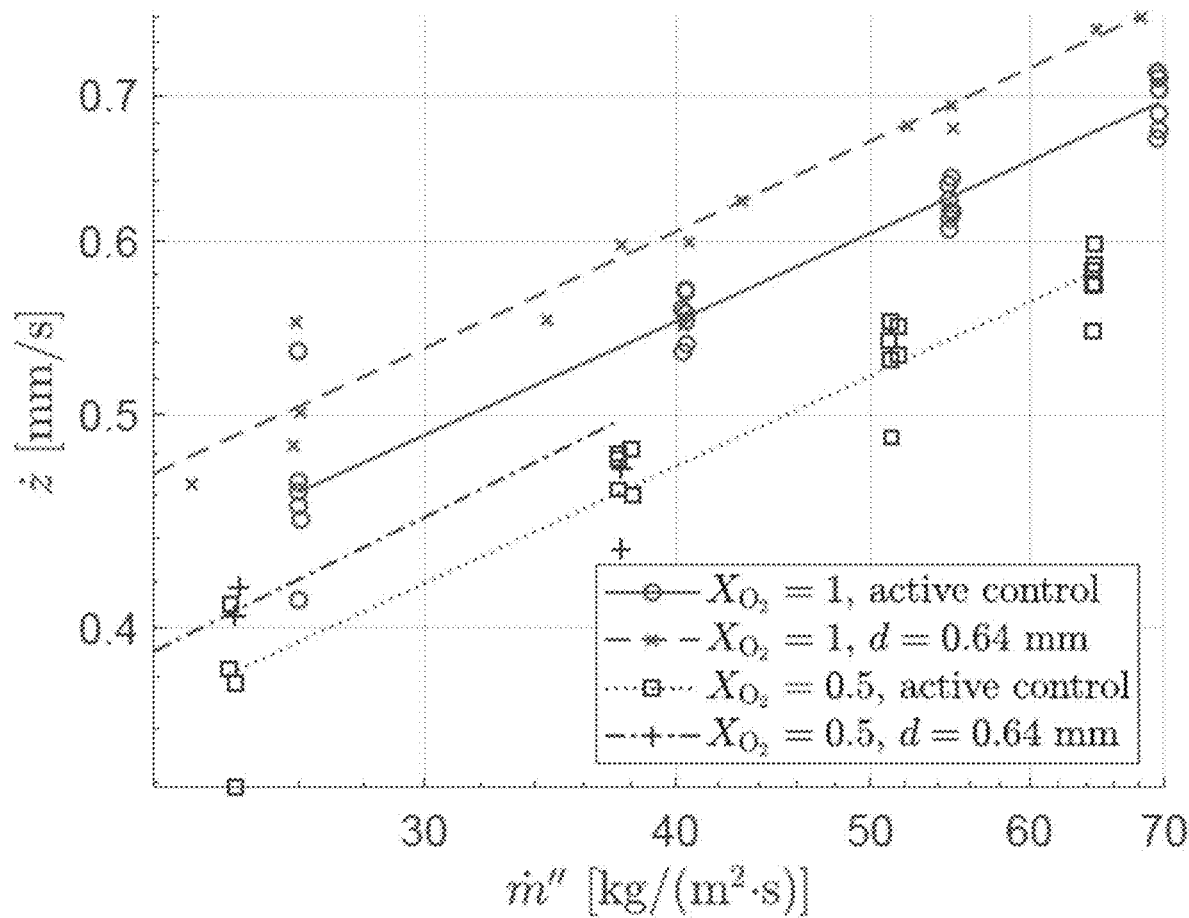
FIG. 12 shows a comparison between passive control d=0.64 mm wire tests and active control tests.

FIG. 12 compares data taken in active control tests with the passive control test data from FIG. 11. For both $X_{O2}=0.5$ and 1, when mass flux was decreased below 25 kg/(m$^2$·s) a layer of sooty material accumulated on the fuel surface and the fuel holder rim. This residue partially or fully obstructed the diode laser beam, rendering active control of the fuel surface impossible. Residue was observed on the burner rim for tests at higher flow rates, but did not obstruct the laser beam, suggesting that the soot either burned or was blown off by the oxidizer stream. Tests with $X_{O2}=0.5$ produced more residue than tests with $X_{O2}=1$.

Figure 13:
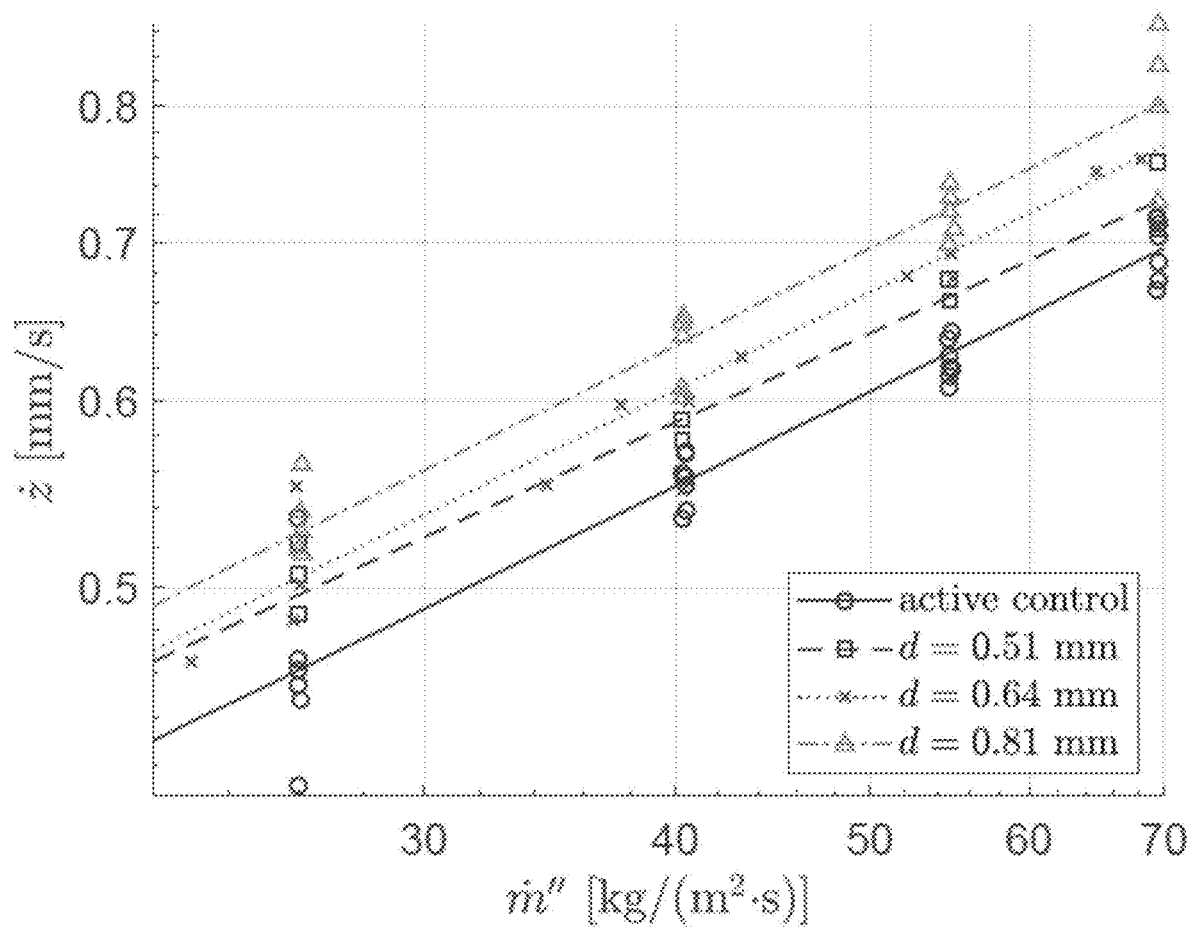
FIG. 13 shows a comparison between wire tests with various wire diameters and active control test, $X_{O2}=1$.

With active control and $X_{O2}=0.5$, high values of mass flux did not cause extinction as they did in passive control tests. The presence of the wire may have disrupted the flow near the surface of the fuel, resulting in altered extinction behavior. Also, for $X_{O2}=1$ at a given mass flux, the regression rate of passive control tests was greater than that of active control tests by about 10%. This suggests that the wire plays a significant role in the pyrolysis and combustion process of HTPB. It may serve as a heat source, readily absorbing radiant heat from the flame and conducting it into the fuel. FIG. 13 shows results at $X_{O2}=1$ with active control and with three gauges of nichrome wire. With all other factors equal, increasing wire diameter caused regression rate to increase.

Modeling Regression Rate

Regression rate expressions typically take the form:

$$\hat{\dot{z}} = a(\dot{m}^H)^{n_1} p^{n_2} T^{n_3}.$$

This equation is used to determine a predicted value of regression rate $\hat{\dot{z}}$ as a function of oxidizer mass flux, oxidizer pressure and temperature, and fitting coefficients a and $n_1$. This is sometimes modified to include geometric terms such as the dimensions of the fuel grain within a combustor.

Oxidizer pressure and temperature were kept constant in this experiment across all test (room conditions at stagnation). This permits a simplified form of the regression rate expression:

$$\hat{z} = a(\dot{m}^H)^n.$$

The fitted curves overlaid on the data points in FIGS. 11, 12, and 13 are of this form. Table 1 provides a summary of the various test conditions with values for a, n, and $R^2$ for each power law fit. N is the number of observations in each set of test conditions. Active control tests are designated by d=0.

TABLE 1

Power law models for various test conditions. Uncertainties provide 95% confidence intervals.

| Index | d [mm] | $X_{O_2}$ | N | min (in") [kg/(m² · s)] | max (in") [kg/(m² · s)] | a [(m³/kg)$^{1/n}$ · 10$^{-4}$] | n | $R^2$ |
|---|---|---|---|---|---|---|---|---|
| a | 0 | 0.5 | 22 | 24.0 | 64.6 | 0.083 ± 0.242 | 0.426 ± 0.063 | 0.92 |
| b | 0 | 1 | 27 | 26.0 | 69.6 | 1.192 ± 0.216 | 0.415 ± 0.046 | 0.94 |
| c | 0.51 | 1 | 10 | 20.0 | 69.5 | 1.393 ± 0.369 | 0.390 ± 0.069 | 0.96 |
| d | 0.64 | 0.5 | 41 | 1.1 | 37.6 | 0.960 ± 0.089 | 0.454 ± 0.033 | 0.96 |
| e | 0.64 | 1 | 56 | 1.2 | 68.2 | 1.263 ± 0.089 | 0.425 ± 0.022 | 0.97 |
| f | 0.81 | 1 | 19 | 26.0 | 69.5 | 1.320 ± 0.332 | 0.425 ± 0.065 | 0.92 |

Comparing the power law coefficients in Table 1 elucidates the effect that oxygen mole fraction and wire diameter have on regression rate. Changes in either quantity cause changes in the multiplicative coefficient a while the exponential coefficient n remains relatively constant. In the log-log plots of FIGS. 11 and 12, the changes in a are shown as changes in vertical offset between the fitted lines. The similar slopes of all fitted lines are due to the similar values of n. This observed trend was used to create a nonlinear regression model representing regression rate as a function of all three experimental variables:

$$\hat{z} = (a + bX_{O_2} + cd)(\dot{m}^H)^n,$$

with fitting coefficients a, b, c, and n. The multiplicative coefficient of the power law was expanded to include linear terms for oxygen mole fraction and wire diameter. Least-squares estimations for the model coefficients are listed in Table 2. The model explains the variation in regression rate well. The null hypothesis (coefficient=0) can be rejected for all four coefficients with $p<0.001$.

TABLE 2

Nonlinear regression model coefficients. $R^2$ = 0.979. N = 178. Uncertainties provide 95% confidence intervals.

| Coefficient | Value |
|---|---|
| a [(m³/kg)$^{1/n}$] | (7.466 ± 0.443) · 10$^{-5}$ |
| b [(m³/kg)$^{1/n}$] | (3.603 ± 0.489) · 10$^{-5}$ |
| c [(m²/kg)$^{1/n}$] | (1.673 ± 0.270) · 10$^{-2}$ |
| n | 0.436 ± 0.013 |

Figure 14A:
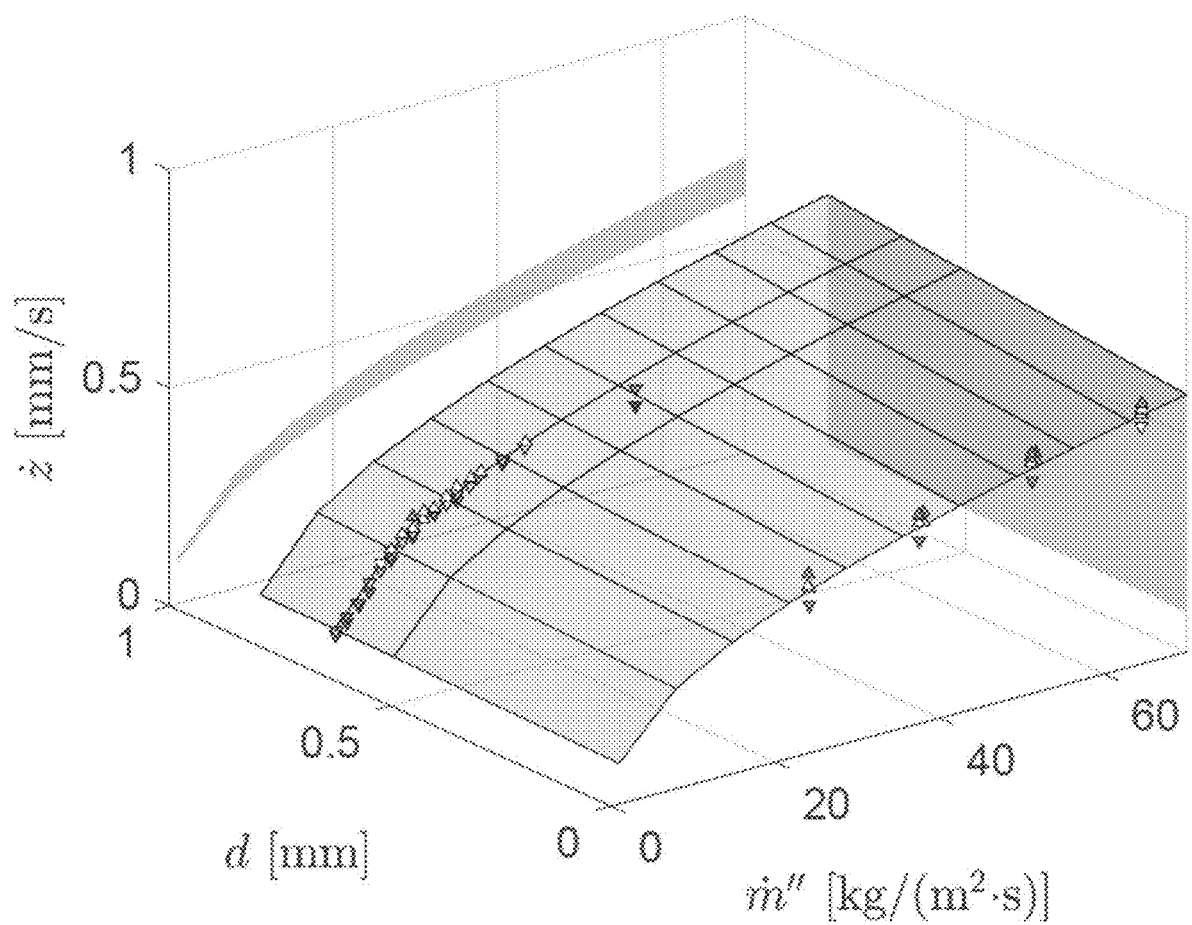
FIGS. 14A-B show a fitted model with regression rate data points.
Figure 14B:
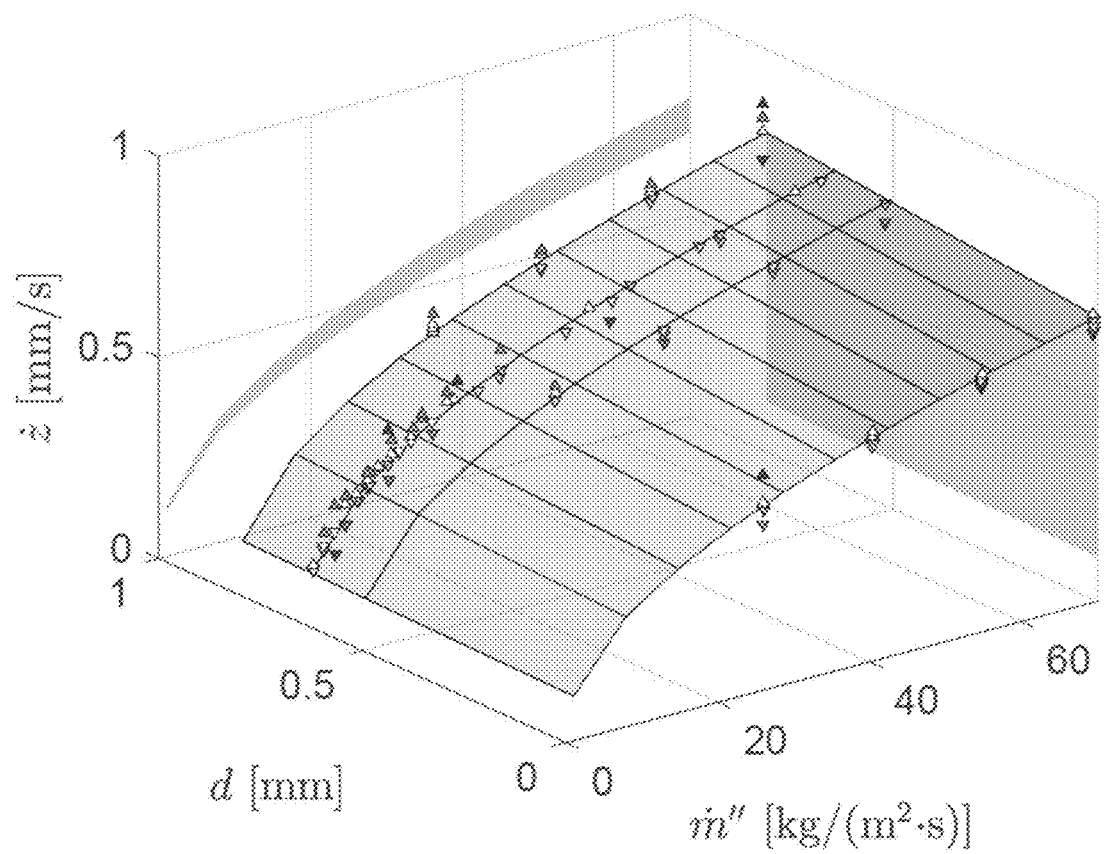

FIGS. 14A-B display all data points and their deviations from the model. FIG. 14A displays data from tests with $X_{O_2}$=0.5. FIG. 13B displays data from tests with $X_{O_2}$=1.

The relative insensitivity of regression rate to the presence of the retaining wire suggests that fuels can be screened in an opposed-flow burner either with or without a wire. Regression rates obtained from wire-based testing may be corrected for the presence of the wire using the nonlinear model presented above. However, the presence of the wire does affect the extinction behavior of the fuels and likely influences the flow velocity field in the vicinity of the fuel surface. An active control method can remove the influence of the wire for future investigations of these or other fundamental properties.

The present invention has been described for use controlling combustion of a solid fuel with a gaseous oxidizer. However, it could also be used to study the combustion of a solid oxidizer with a gaseous fuel or the combustion of a premixed solid propellant.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. An active method of controlling the position of a burning surface of a solid fuel strand, comprising:
   placing a solid fuel strand into a housing;
   advancing the solid fuel strand through the housing using a screw attached to a motor that is controlled by a computer;
   directing a beam of light from a diode laser that skims a desired fuel strand surface position, wherein the light transmitted by the diode laser is collected by a photodiode; and
   using a digital control loop to control the solid fuel strand position, wherein the digital control loop sends commands to the motor to adjust velocity based on the light collected by the photodiode, and wherein solid fuel strand position data is saved as a function of time allowing for direct calculation of regression rate as a function of time.

2. The method of claim 1, wherein the motor is a stepper motor.

3. The method of claim 1, wherein the control loop is a proportional-integral-derivative (PID) control loop.

4. The method of claim 1, wherein the control loop is integrated into a larger control system comprising automated ignition and shutdown sequences.

5. An apparatus for controlling the position of a burning surface of a solid fuel strand, comprising:
   a housing through which a solid fuel strand is advanced using a screw attached to a motor that is controlled by a computer;
   a diode laser that produces a beam that skims a desired fuel strand surface position;
   a photodiode that collects light transmitted by the diode laser; and a digital control loop that controls solid fuel strand position by sending commands to the motor to adjust velocity based on the light collected by the photodiode, wherein solid fuel strand position data is saved as a function of time allowing for direct calculation of regression rate as a function of time.

6. The apparatus of claim 5, wherein the motor is a stepper motor.

7. The apparatus of claim 5, wherein the control loop is a proportional-integral-derivative (PID) control loop.

8. The apparatus of claim 5, wherein the control loop is integrated into a larger control system comprising automated ignition and shutdown sequences.

* * * * *